United States Patent [19]

Yamamoto et al.

[11] 3,783,367

[45] Jan. 1, 1974

[54] CONSTANT-VOLTAGE CONVERTER EMPLOYING THYRISTOR

[75] Inventors: Katsuhiko Yamamoto; Ryuhei Nakabe, both of Osaka, Japan

[73] Assignee: Matsushita Electric Industrial Company Limited, Osaka, Japan

[22] Filed: Nov. 22, 1971

[21] Appl. No.: 200,760

[52] U.S. Cl................. 321/11, 321/18, 323/22 SC
[51] Int. Cl....................... H02p 13/26, H02m 7/00
[58] Field of Search.......................... 321/11, 18, 47; 307/252 N, 252 P, 228; 323/22 SC, 39

[56] References Cited
UNITED STATES PATENTS

| | | | |
|---|---|---|---|
| 3,116,446 | 12/1963 | Healey............................. | 321/47 X |
| 3,412,314 | 11/1968 | Crane.............................. | 323/22 SC |
| 3,564,388 | 2/1971 | Nolf................................. | 321/18 |
| 3,597,675 | 8/1971 | Peek................................ | 321/18 |
| 3,336,531 | 8/1967 | Yamada.......................... | 307/252 N |
| 3,304,486 | 2/1967 | Michaels......................... | 321/18 |
| 3,562,621 | 2/1971 | Schaefer......................... | 321/18 |

FOREIGN PATENTS OR APPLICATIONS

| | | | |
|---|---|---|---|
| 1,058,160 | 2/1967 | Great Britain................... | 321/18 |

Primary Examiner—Gerald Goldberg
Attorney—John Lezdey

[57] ABSTRACT

A constant voltage converter having a rectifier for rectifying AC power and with a thyristor connected between the rectifier and a filter for selectively passing therethrough a rectified output to an output terminal. There is a wave generator connected to the output of the rectifier for producing a first signal and an intergrator circuit connected to the output of the wave generator for producing an integral output in response to this first signal. In addition there is a detector circuit for detecting a fluctuation of the rectified output power and for producing second signal. A comparison circuit is connected between the intergrator circuit and the detector circuit for producing third signal in accordance with the comparison. A trigger circuit is connected between the comparison circuit and the control gate of the thyristor for supplying a phase control signal to the thyristor to thereby obtain a constant voltage output regardless of the fluctuation of the rectified output.

1 Claim, 16 Drawing Figures

CONSTANT-VOLTAGE CONVERTER EMPLOYING THYRISTOR

This invention relates to constant-voltage converters and more particularly to a constant-voltage converter employing a thyristor.

Conventional constant-voltage converters of the type employing a thyristor are arranged to phase shift and full-wave-rectify an input a.c. power applied thereto and to maintain the output voltages constant by regulating the firing angle of the thyristor in comparison of the output voltages with the phase-shifted and rectified input a.c. power. When, however, these converters are connected to a common a.c. source having a relatively high internal impedance, the waveform of the phase-shifted and rectified a.c. input power is distorted thereby causing undesired operations of the converters.

It is therefore an object of the present invention to provide a constant-voltage converter which correctly operates notwithstanding the distortion of the input a.c. voltage.

Another object of the invention is to provide a constant-voltage converter which effectively suppress an undesired rush current.

Another object of the invention is to provide a constant-voltage converter having an improved feed-back circuit of a substantially constant loop gain.

Figure 1:
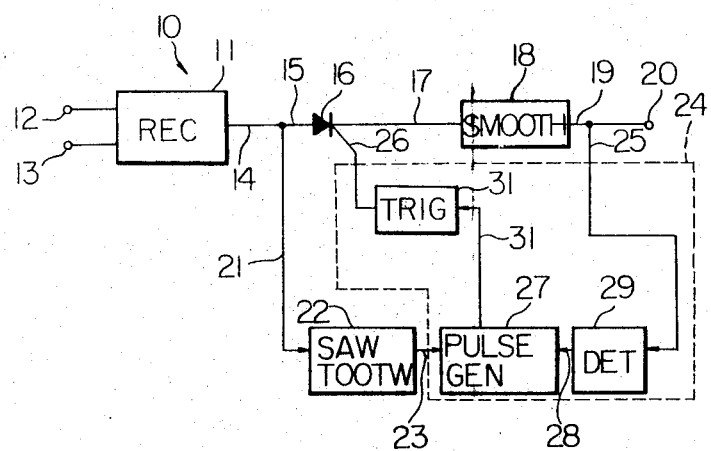
FIG. 1 is a schematic view of a converter according to the present invention.

Referring now to FIG. 1, a constant-voltage converter 10 according to the present invention comprises a rectifier 11 having two input terminals 12 and 13 through which an a.c. power is supplied. The rectifier 11 is preferably a full-wave rectifier although a half-wave rectifier may be employed. An output 14 of the rectifier 11 is connected through a line 15 to an anode of a thyristor 16. The thyristor 16 passes therethrough the rectified a.c. power in only one direction from its anode to cathode when triggered by a trigger pulse through its gate. The cathode of the thyristor 16 is connected through a line 17 to an input of a smoothing filter 18. The smoothing filter 18 smoothes the power from the thyristor 16. An output of the smoothing filter 18 is connected through a line 19 to an output terminal 20. The output 14 of the rectifier 11 is also connected through a line 21 to a saw-tooth wave generator 22 which generates a saw-tooth wave signal having the same repetition period as the rectified input a.c. power. An output of the saw-tooth wave generator 22 is connected through a line 23 to one input of a trigger pulse generator 24. The other input of the trigger pulse generator 24 is connected through a line 25 to the line 19. An output of the trigger pulse generator 24 is connected through a line 26 to the gate of the thyristor 16. The trigger pulse generator 24 produces a trigger pulse on its output when the voltage of the saw-tooth wave signal reaches a level which is varied in response to the output voltage on the terminal 20. The trigger pulse generator 24 may be variously arranged and in this case arranged to comprise rectangular generator 27 having one input connected through the line 23 to the saw-tooth wave generator 22 and the other input connected through a line 28 to an output voltage detector 29. The detector 29 produces a reference signal representing the output voltage on the terminal 20. The pulse generator 27 is adapted to produces a rectangular pulse when the saw-tooth wave signal to the one input reaches a level which defined is in accordance with the reference signal. An output of the rectangular pulse generator 27 is connected through a line 30 to an input of a trigger circuit 31. The trigger circuit 31 is adapted to convert the rectangular pulse into a spike pulse. An output of the trigger circuit 31 is connected through the line 26 to the gate of the thyristor 16.

Figure 2:
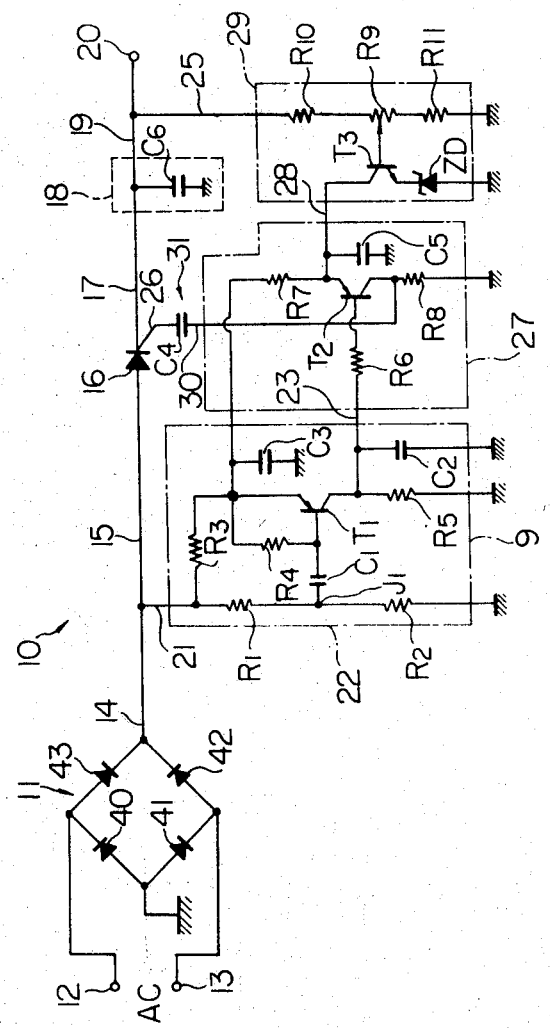
FIG. 2 is a diagram showing a circuit arrangement of the converter of FIG. 1.

FIG. 2 illustrates a preferred circuit arrangement of the converter shown in FIG. 1 which comprises a rectifier 11 of a full-wave rectifier consisting of rectifiers 40, 41, 42 and 43. Inputs of the rectifier are connected to terminals 12 and 13 through which an a.c. power is applied. The output 14 of the rectifier 11 is connected through a line 15 to an anode of a thyristor 16. A cathode of the thyristor 16 is connected through a line 17 to a smoothing filter 18 which includes a capacitor C4 having one terminal connected to the line 17 and the other terminal grounded. The output of the smoothing filter 18 is connected through a line 19 to an output terminal 20.

The saw-tooth wave generator 22 includes a resistor $R_1$ having one terminal connected to the line 21 and the terminal connected through a junction $J_1$ to one terminal of a resistor $R_2$. The other terminal of the resistor $R_2$ is grounded. The junction $J_1$ is connected through a coupling capacitor $C_1$ to a base of a transistor $T_1$ of PNP type. An emitter of the transistor $T_1$ is connected through a resistor $R_3$ to the line 21. A resistor $R_4$ is provided between the emitter and the base of the transistor $T_1$ so as to apply a bias potential to the base. A collector of the transistor $T_1$ is grounded through a parallel connection of a resistor $R_5$ and capacitor $C_2$. To the emitter is connected a capacitor $C_3$ which is in turn grounded and passes therethrough only a.c. signals to the ground.

The rectangular pulse generator 27 comprises a transistor $T_2$ of PNP type having a base connected through a resistor $R_6$ to the collector of the transistor $T_1$. An emitter of the transistor $T_2$ is connected through a resistor $R_7$ to the emitter of the transistor $T_1$. A collector of the transistor $T_2$ is grounded through a resistor $R_8$ and connected through the line 30 to one terminal of a capacitor $C_4$ of the trigger circuit 31. The other terminal of the capacitor $C_4$ is connected through a line 26 to the gate of the thyristor 16.

The output voltage detector 29 includes a transistor $T_3$ of NPN type having an emitter grounded through a zener diode ZD. A collector of the transistor $T_3$ is connected through a line 28 to the emitter of the transistor $T_2$ and, on the other hand, connected through a capacitor $C_5$ to the grounded. A base of the transistor $T_3$ is connected to a tap of an adjustable resistor $R_9$ connected through a resistor $R_{10}$ and a line 25 to the line 19 and connected, in turn, to the ground through a resistor $R_{11}$.

When, in operation, an a.c. electric power is applied through the input terminals 12 and 13 of the rectifier 11, a full-wave rectified power as shown in FIG. 3 (a) appears on the output 14. The rectified power is applied through the line 15 to the anode of the thyristor 16. The thyristor 16 passes therethrough the rectified power while its firing angle is regulated by the trigger signal applied to the gate. The rectified power passed through the thyristor 16 is applied through the line 17 to the smoothing filter 18. The smoothing filter smoothes the power by removing the ripple component in the power. The smoothed power appears on the line 19 which is to be supplied to a load through the output terminal 20. The smoothed power on the line 19 is, on the other hand, delivered through the line 25 to the resistor $R_{10}$ of the output voltage detector 29. The resistor $R_{10}$ constitutes a voltage divider in cooperation with the resistors $R_9$ and $R_{11}$. The output of the voltage divider is applied through the tap of the resistor $R_9$ to the base of the transistor $T_3$. When the potential of the base of the transistor $T_3$ exceeds the zener voltage of the zener diode ZD, a base current flows through the transistor $T_3$ so as to render the transistor $T_3$ conductive. The potential of the collector of the transistor $T_3$ then varies in accordance with the voltage of the smoothed output power on the line 19. The potential variation at the collector of the transistor $T_3$ is then applied through the line 28 to the trigger pulse generator 27 and utilized to regulate the triggering timing of the thyristor 16.

Figure 3A:
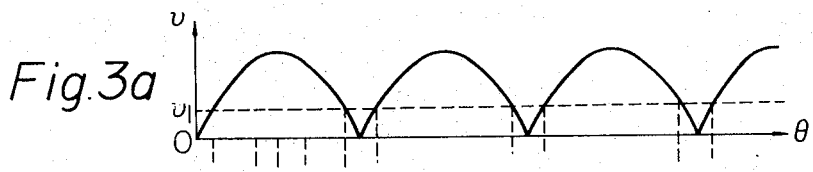
FIG. 3 is a diagram showing various waveforms of signals appearing in the circuit of FIG. 2.

The full-wave rectified power is, on the other hand, applied through the line 21 to the saw-tooth wave generator 22. Since the resistors $R_1$ and $R_2$ consistute a voltage divider to reduce the voltage of the full-wave rectified power to a potential at the junction $J_1$, a charging current to the capacitor $C_1$ flows from the emitter to the base of the transistor $T_1$ whereby the transistor $T_1$ repeats ON-OFF operation in accordance with the voltage of the rectified power. If the transistor $T_1$ is conductive when the voltage of the full-wave rectified power is lower than a threshold voltage $v_1$ as shown in FIG. 3(a), then the potential at the collector of the transistor $T_1$ is varied as shown in FIG. 3 (b) due to the charge and discharge of the capacitor $C_2$. The variation of the potential at the collector of the transistor $T_1$ is supplied through the line 23 to the resistor $R_6$ of the trigger pulse generator 27.

Figure 3B:
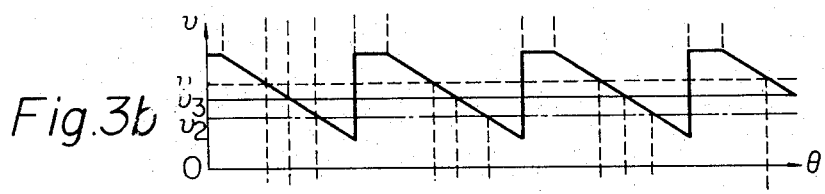
Figure 3C:
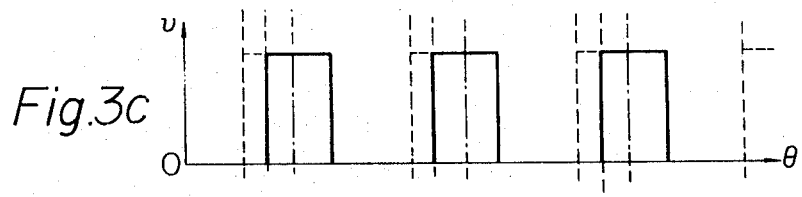
Figure 3D:
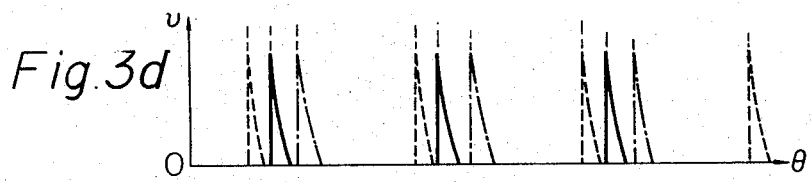
Figure 4A:
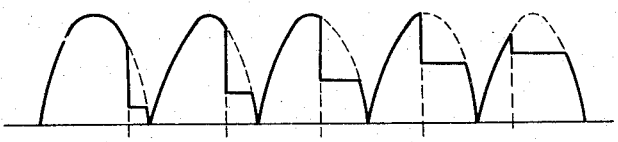
FIG. 4 is a diagram showing various waveforms appearing in the circuit of FIG. 2 when an a.c. power is supplied to the circuit.
Figure 4B:
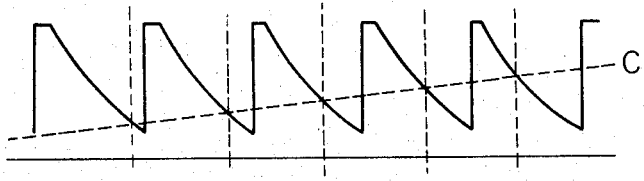
Figure 4C:
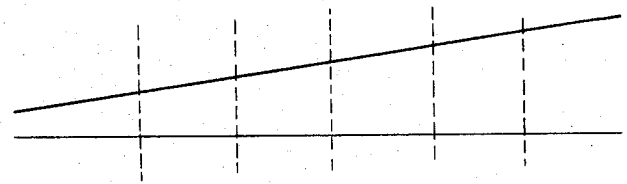
Figure 4D:
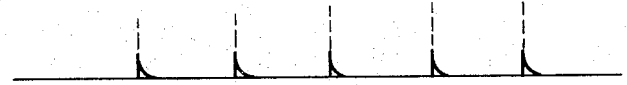
Figure 4E:
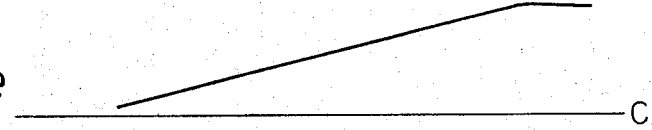

As long as the voltage of the smoothed power on the line 19 equals to the rated output voltage, the transistor $T_2$ is adapted to become conductive when the voltage of the saw-tooth wave signal falls below a threshold value $v_3$ shown in FIG. 3(b). Therefore, a potential at the collector of the transistor $T_2$ varies as shown in FIG. 3(c). The potential variation, that is, a pulse signal at the collector of the transistor $T_2$ is supplied through the line 30 to the capacitor $C_4$ of the trigger circuit trigger 31. The trigger circuit 31 converts the pulse signal into a spike pulse or a trigger pulse shown in FIG. 3(d) which is then applied through the line 25 to the gate of the thyristor 16. Upon receiving the spike pulse, the thyristor 16 becomes conductive until the voltage of the rectified power on the line 15 falls below the cut-off voltage of the thyristor 16.

When the voltage of the smoothed power on the line 19 exceeds the rated output voltage, the collector current of the transistor $T_3$ increases with the result that the current flowing through the resistor $R_7$ increases. The threshold voltage of the transistor $T_2$ therefore reduces to a voltage $v_2$ as shown in FIG. 3(b). At this instant, leading edge of the pulse signal delays as shown by dot-and-dash lines in FIG. 3(c), so that each trigger pulse delays as shown by dot-and-dash line in FIG. 3(d). When on the contrary, the voltage of the smoothed signal on the line 19 lowers below the rated output voltage, the collector current of the transistor $T_3$ decreases whereby the threshold voltage rises to a voltage $v_4$ in FIG. 3(b). Each leading edge of the signal pulse now leads as shown by dotted line in FIG. 3(d). Being apparent from the above description, the appearance timing of each trigger pulse is regulated in accordance with the voltage of the smoothed power on the line 19 so that the voltage of the output voltage at the terminal 20 is held substantially constant.

Referring now to FIG. 4, start operation of the converter 10 is discussed hereinbelow in conjunction with FIG. 2. When an a.c. voltage is applied to the input terminals 12 and 13, the capacitor $C_3$ begins to be charged by the voltage on the line 15, and the capacitor $C_5$ also begins to be charged through the resistors $R_3$ and $R_7$. It is important that the time constant of power supply circuit constituted by the resistor $R_3$ and the capacitor $C_3$ is selected to be much larger than that of the time constant of another power supply circuit constituted by the resistor $R_7$ and the capacitor $C_5$. Thus, the emitter potential of the transistor $T_1$ is built up more quickly than that of the transistor $T_2$. Upon completion of the charging of the capacitor $C_3$, the saw-tooth wave generator 22 begins to generate saw-tooth wave signal as shown in FIG. 4(b). Since the capacitor $C_5$ is, on the other hand, slowly charged, the emitter voltage of the transistor $T_2$ slowly rises as shown in FIG. 4(c), so that, the threshold voltage of the transistor $T_2$ gradually rises as shown by a dotted line in FIG. 4 (b). Accordingly, the trigger pulses is produced on the gate of the thyristor 16 as shown in FIG. 4(d), whereby the firing angle of the thyristor 16 is gradually reduced as shown in FIG. 4(a) which illustrates the voltage at the output terminal 14 of the rectifier 11. The output voltage on the output terminal 20 therefore gradually rise up as shown in FIG. 4(e). It is to be understood that since the output voltage of the converter 10 starts to gradually rise up as shown in FIG. 4(e), an undesired rush current is effectively suppressed.

Figure 5:
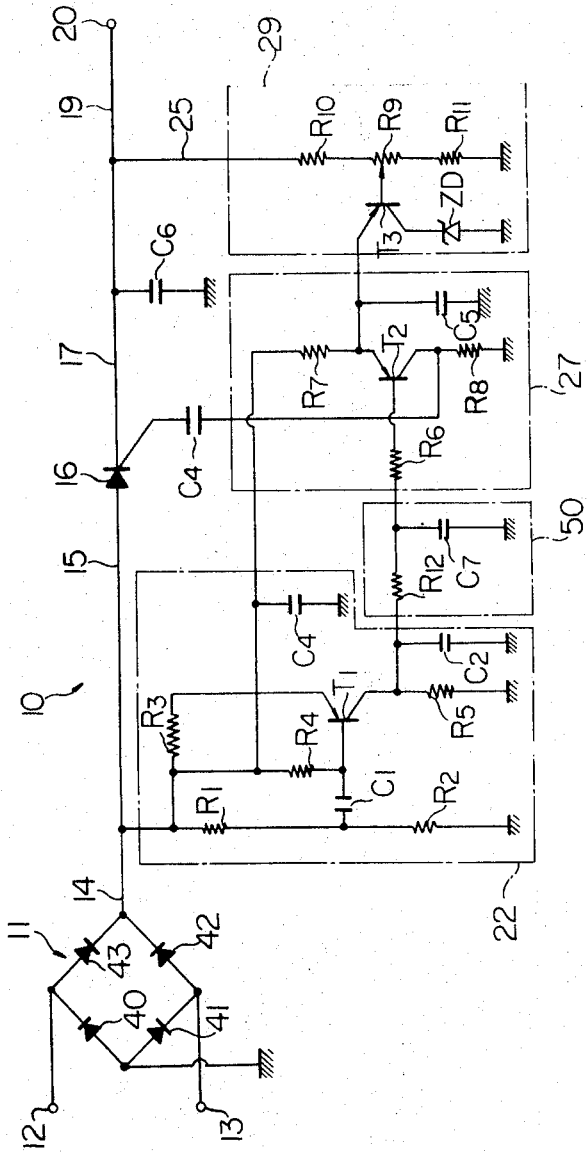
FIG. 5 is a diagram showing another circuit arrangement of the converter of FIG. 1.

FIG. 5 illustrates another form of the converter 10 which is arranged identically to the circuit arrangement of FIG. 1 except that an integrator 50 is interposed between the output of the saw-tooth wave generator 22 and the input of the trigger pulse generator 27. The integrator 50 includes a resistor $R_{12}$ having one terminal connected to the output of the saw-tooth wave generator 22 and the other terminal connected to the input of the rectangular pulse generator 27, and a capacitor $C_7$ having one terminal connected to the other terminal of the resistor $R_{12}$ and the other terminal grounded.

Figure 6A:
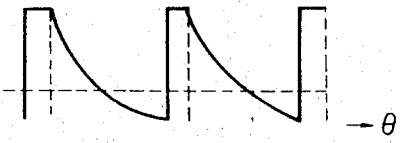
FIG. 6 is a diagram showing waveforms of signals appearing in the circuit of FIG. 5.
Figure 6B:
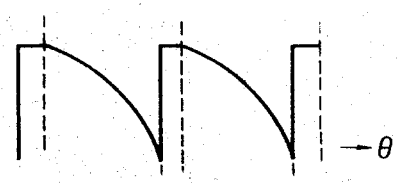
Figure 6C:

In operation, the saw-tooth wave generator 22 produces on its ouput a saw-tooth wave signal having decreasing exponential wave form portion as shown in FIG. 6 (a), although the saw-tooth wave signal ideally is illustrated in FIG. 3. This saw-tooth wave signal is converted by the integrator 50 into another form of saw-tooth wave having a increasing exponential wave form portion as shown in FIG. 6(b).

It should be noted that the saw-tooth wave signal of FIG. 6(a) has a smaller inclination near 180°. Hence, when the integrator 50 is omitted and the saw-tooth wave signal as shown in FIG. 6(a) is applied to the trigger pulse generator 27, the rate of change of the output voltage of the converter 10 become larger at a firing angle near to 180°. On the other hand, it is apparent from FIG. 6(c) that the rate of change the output voltage of the thyristor 16 with respect to the firing angle become large at a firing angle near to 180°. Therefore, the loop gain of the trigger pulse generator 24 increases when the firing angle of the thyristor 16 is near to 180°. It is apparent through a similar discussion that the loop gain of the trigger pulse generator 24 decreases when the firing angle is near to 90°. Such non-uniformity of the loop gain of the trigger pulse generator invites a difficulty of the regulation of the output voltage of the converter. It is to be noted that the saw-tooth wave signal shown in FIG. 6(b) has a large inclination at an angle near 180°. Therefore, when the saw-tooth wave signal of FIG. 6(b) is applied to the trigger pulse generator 24, the loop gain of the trigger pulse generator 24 is held substantially constant, whereby the output voltage of the converter is effectively held constant.

It is to be understood that the integrator 50 may be substituted for by a miller integrator and a bootstrap integrator. Furthermore, a plurality of integrator may be employed, if desired.

Figure 7:
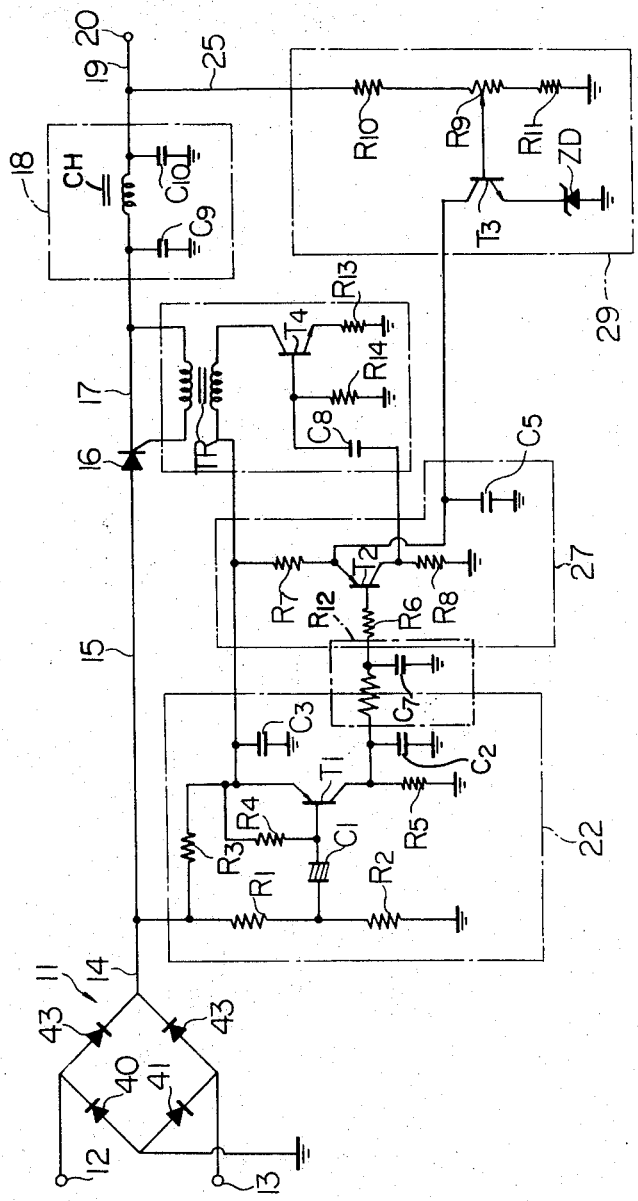
FIG. 7 is a diagram showing further another circuit arrangement of generator the of FIG. 1.

FIG. 7 illustrates another circuit arrangement of the converter according to the present invention, which is arranged identically to the circuit of FIG. 2 except for the trigger circuit 31 and the smoothing circuit 18.

The trigger circuit 31 of FIG. 7 comprises a transformer TR with primary and secondary coils. One terminal of the primary coil is connected to the resistor $R_7$ of the pulse generator 27. The other terminal of the primary coil is connected to a collector of a transistor $T_4$ of NPN type. The secondary coil has terminals respectively connected to the gate and cathode of the thyristor 16. An emitter of the transistor $T_4$ is grounded through a resistor $R_{13}$. A base of the transistor $T_4$ is grounded through a resistor $R_{14}$ and connected through a capacitor $C_8$ to the collector of the transistor $T_2$ of the pulse generator 27.

The smoothing filter 18 of FIG. 7 comprises a choke coil CH connected to the lines 17 and 19, and to capacitors $C_9$ and $C_{10}$ which are in turn grounded. The circuit of FIG. 7 operates in the same manner as the circuit of FIG. 2.

Obviously many modifications and variations of the present invention are possible in the light of the above teachings. It is therefore to be understood that within the scope of the appended claims the invention may be practiced otherwise than as specifically described.

What is claimed is:

1. A constant voltage converter comprising an input of a power supply means, an output terminal, filter means, rectifier means connected to said input for rectifying a.c. power and for supplying output thereof to said output terminal, thyristor means connected between said rectifier means and said filter means for selectively passing therethrough a rectified output to the output terminal by way of said filter means, saw-tooth wave generator means connected between the output of said rectifier means and at least one integrator circuit means for producing an integral output in response to a saw-tooth wave produced, a first transistor in said saw-tooth wave generator, the input of said integrator circuit means being connected to a collector of said first transistor, detector circuit means connected to said output terminal for detecting a fluctuation of the rectified output power and for producing an output signal, said detector circuit means having a second transistor, pulse generator circuit means connected between said saw-tooth wave generator means and said detector circuit means for producing a trigger pulse to said thyristor through a trigger means, a third transistor in said pulse circuit generator means, the base of said third transistor being connected to the output of said integrator circuit means, the emitter thereof being connected to the emitter of said second transistor in said detector circuit means, and the collector thereof being connected to the gate of the thyristor means so as to supply a phase control signal thereto, thereby obtaining a constant voltage output regardless of the fluctuation of the rectified output.

* * * * *